Sept. 15, 1959 B. L. MEYER 2,904,683

PHASE DEMODULATION

Filed Oct. 23, 1956 3 Sheets-Sheet 1

INVENTOR
BRUCE L. MEYER

BY Cushman, Darby & Cushman
ATTORNEYS

Sept. 15, 1959 B. L. MEYER 2,904,683
PHASE DEMODULATION
Filed Oct. 23, 1956 3 Sheets-Sheet 2
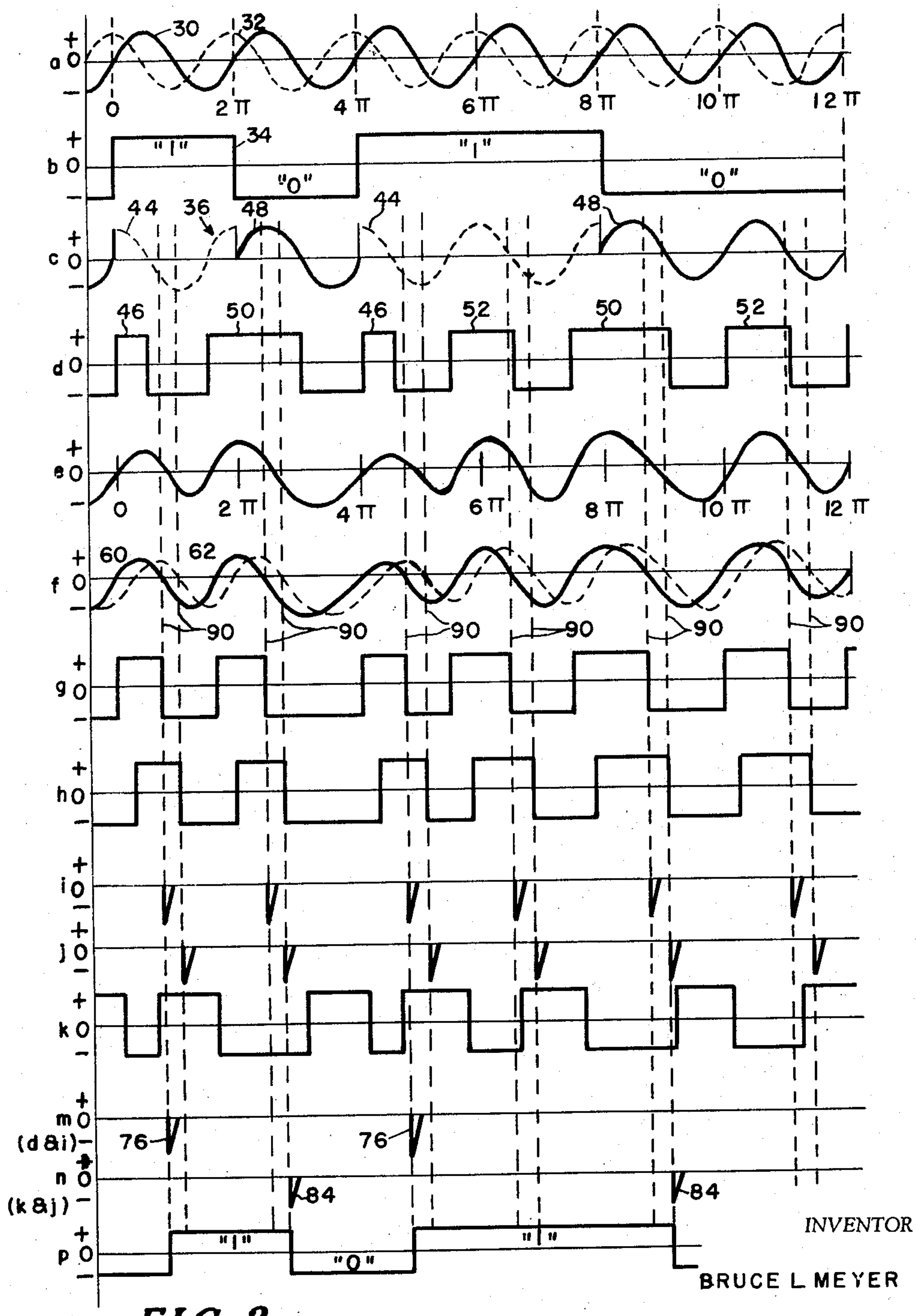
FIG. 2a-p
INVENTOR
BRUCE L. MEYER
BY Cushman, Darby & Cushman
ATTORNEYS

INVENTOR
BRUCE L. MEYER

BY Cushman, Darby & Cushman
ATTORNEYS

United States Patent Office 2,904,683
Patented Sept. 15, 1959

2,904,683

PHASE DEMODULATION

Bruce L. Meyer, Bloomington, Minn., assignor to Sperry Rand Corporation, New York, N.Y., a corporation of Delaware Application October 23, 1956, Serial No. 617,707

20 Claims. (Cl. 250—27)

This invention relates to phase modulated digital communication and more specifically to improved demodulation therefor.

In digital communications systems there are available several means of modulation; namely, amplitude modulation, frequency modulation, phase modulation, and pulse-time modulation among several others. Each technique has its advantages and disadvantages. For high rates of information transfer in a relatively narrow signal bandwidth with a minimum of errors due to the communications means, a good choice is a phase modulated system. The IRE standard on phase modulation (Standard 53 IRE 11.51) defines it as "angle modulation in which the angl of a sine-wave carrier is caused to depart from the carrier angle by an amount proportional to the instantaneous value of the modulating wave" wherein angle modulation is "modulation in which the angle of a sine-wave carrier is the characteristic varied from its normal value." Applying the above definitions to a digital communications system utilizing a binary coding scheme, a "0" can be zero phase shift while a "1" can be, for example, a 90° phase advance or retard.

The desire for high rates of data transmissions over carrier systems is well recognized. To achieve this end abrupt phase modulation, i.e., an almost instantaneous change in phase angle, can be employed to decrease the number of carrier cycles per bit (binary digit) of information. In a stable receiving system, it is desirable that the reference frequency be derived from the incoming phase modulated signal. This means, that the reference frequency generated by a local receiver oscillator will attempt to assume a fixed phase angle with respect to the incoming information signal. Because of the high "Q" inherent in a stable frequency generator, the reference frequency can assume an average or quasi-static phase relation to the incoming wave which phase is between the unmodulated carrier phase and the modulated carrier phase. When a pulse coincidence type of demodulator is used and a condition of no intelligence transmission exists, the reference frequency generator usually becomes phase locked with the incoming signal. When this happens, a condition of detection instabiilty is created because any extraneous or random phase modulation, such as that produced by noise for example, may result in spurious outputs.

Accordingly, it is a prime object of this invention to provide a demodulator apparatus capable of operating in a high-speed phase modulated digital communication system.

It is another object of this invention to provide phase demodulator apparatus exhibiting a high degree of detection stability.

It is still another object of this invention to provide phase demodulator apparatus which derives from the received signal two signals out of phase with each other and with the input signal.

It is a further object of this invention to provide phase demodulator apparatus with passive electrical networks creating a phase or time zone of no signal detection.

Other objects and advantages of this invention will become obvious to those of ordinary skill in the art from the following detailed description of exemplary embodiments of the invention as illustrated in the drawings, wherein:

Figure 1 diagrammatically illustrates means for generating a phase modulated wave;

Figure 2*a* illustrates two sine waves usable in a phase modulated digital communications system;

Figure 2*b* illustrates an exemplary modulating rectangular wave;

Figure 2*c* illustrats a phase modulated sine wave containing the modulation information of the wave in Figure 2*b*;

Figure 2*d* illustrates a rectangular wave derived from the phase modulated signal shown in Figure 2*c*;

Figure 2*e* illustrates a receiver reference wave derived from the wave of Figure 2*d*;

Figure 2*f* illustrates two waves derived from the wave of Figure 2*e*, one leading and one lagging in phase with respect thereto;

Figure 2*g* illustrates a rectangular wave derived from the leading wave of Figure 2*f*;

Figure 2*h* illustrates a rectangular wave derived from the lagging wave of Figure 2*f*;

Figure 2*i* illustrates electrical impulses derived from the trailing edge of the wave in Figure 2*g*;

Figure 2*j* illustrates the electrical impulse derived from the trailing edge of the wave in Figure 2*h*;

Figure 2*k* illustrates the wave of Figure 2*d* inverted;

Figure 2*m* illustrates electrical impulses produced upon coincidence of the impulses of Figure 2*i* and the negative portions of the wave of Figure 2*d*;

Figure 2*n* illustrates electrical impulses produced upon coincidence of the impulses of Figure 2*j* and the negative portion of the wave of Figure 2*k*;

Figure 2*p* illustrates the reproduced wave of Figure 2*b* as a result of the electrical impulses of Figures 2*m* and 2*n* acting on a bistable multivibrator;

Figure 1:
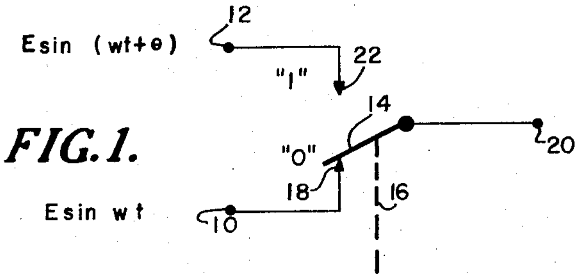

Figure 1 diagrammatically illustrates the basic principle of a phase modulator in a digital communication system. Actual means of phase modulation are discussed by Terman in "Radio Engineers' Handbook" 1st edition, McGraw-Hill, 1943, at pages 582 and 583. In Figure 1 wave $E \sin wt$, which may be considered the carrier wave, is applied continuously to terminal 10 during which time wave $E \sin (wt+\phi)$ is applied to terminal 12. In this formulae, E is the peak value of the wave, $w$ is the frequency in radians per second, $\phi$ is a constant phase angle in radians and $t$ is the time in seconds. Modulator control information controls switch arm 14 by means diagrammatically indicated by dashed line 16 in such a manner that when the binary modulating information is a "0," arm 14 is against contact 18 and the output at terminal 20 is wave $E \sin wt$. Similarly, when the modulating information is a "1," arm 14 is against contact 22 and the output wave at terminal 20 is $E \sin (wt+\phi)$. These two waves are illustrated in Figure 2*d*, $E \sin wt$ being represented by the solid line 30, while $E \sin (wt+\phi)$ is represented by the dotted line 32. The illustrated phase angle between waves 30 and 32 is 90°; however, limitation thereto is not intended since the phase difference may be any angle less than 180°.

Figure 2*b* illustrates a typical modulating rectangular wave 34. By arbitrary definition the modulation information is a "1" when said wave is positive and a "0" when negative. Thus arm 14 in Figure 1 is against contact 22 when the modulating wave 34 is positive and against contact 18 when said wave is negative. The idealized resultant wave 36 obtained from combining the sine waves of Figure 2*a* and the rectangular wave of Figure 2*b* in and by apparatus like that of Figure 1 is illustrated in Figure 2*c*, with the solid line portions of wave 36 being that obtained from solid wave 30 of Figure 2*a* while the rectangular wave 34 was negative, and the dashed line portions of wave 36 being obtained from dashed wave 32 while wave 34 was positive. Even though Figures 2*b* and 2*c* show wave 34 being switched for modulating carrier wave 30 beginning only at times when wave 30 is zero, the invention is not to be limited to demodulating such a resultant waveform (i.e., as that shown in Figure 2*c*) since broadly the invention is also equally applicable to demodulating waveforms resulting from modulation switching at all points of a reference amplitude along carrier wave 30.

Recovery of the modulation information of Figure 2*b* from the illustrated wave in Figure 2*c* may be accomplished by utilizing a local oscillator or a ringing circuit, which generates the same frequency as the transmitted signal, as a phase reference. If said reference frequency is $E \sin (wt+\phi/n)$, where $n$ is a constant greater than unity, phase demodulation by any conventional method is possible. As phase modulation occurs, the phase of the reference signal should not change so that the incoming signal will alternately lead and lag in phase relative to said reference signal.

At times, however, the reference oscillator becomes phase-locked with the incoming signal, and detection instability arises; that is, any minute phase shift of the incoming signal, such as may be caused by extraneous signals like noise, may result in spurious outputs from the demodulator apparatus. This invention eliminates such instability by creating a phase or time zone of no detection. That is, by this invention there is created a zone or degree range of phase shift in which the incoming signal, whether modulated or not, may be phase shifted without causing undesirable detection of such phase shifting. Therefore, small phase shifts caused by extraneous signals would not be detected as long as they are within said zone or range. Such a zone or range may also be viewed as a phase-change threshold; that is, the incoming signal must contain a phase deviation in excess of a predetermined portion of the threshold value (said predetermined portion being determined as hereinafter discussed but usually being equal to one-half) to produce a new information output from the demodulator. This function is better understood with reference to Figures 2*c* through 3.

Figures 3, 4:
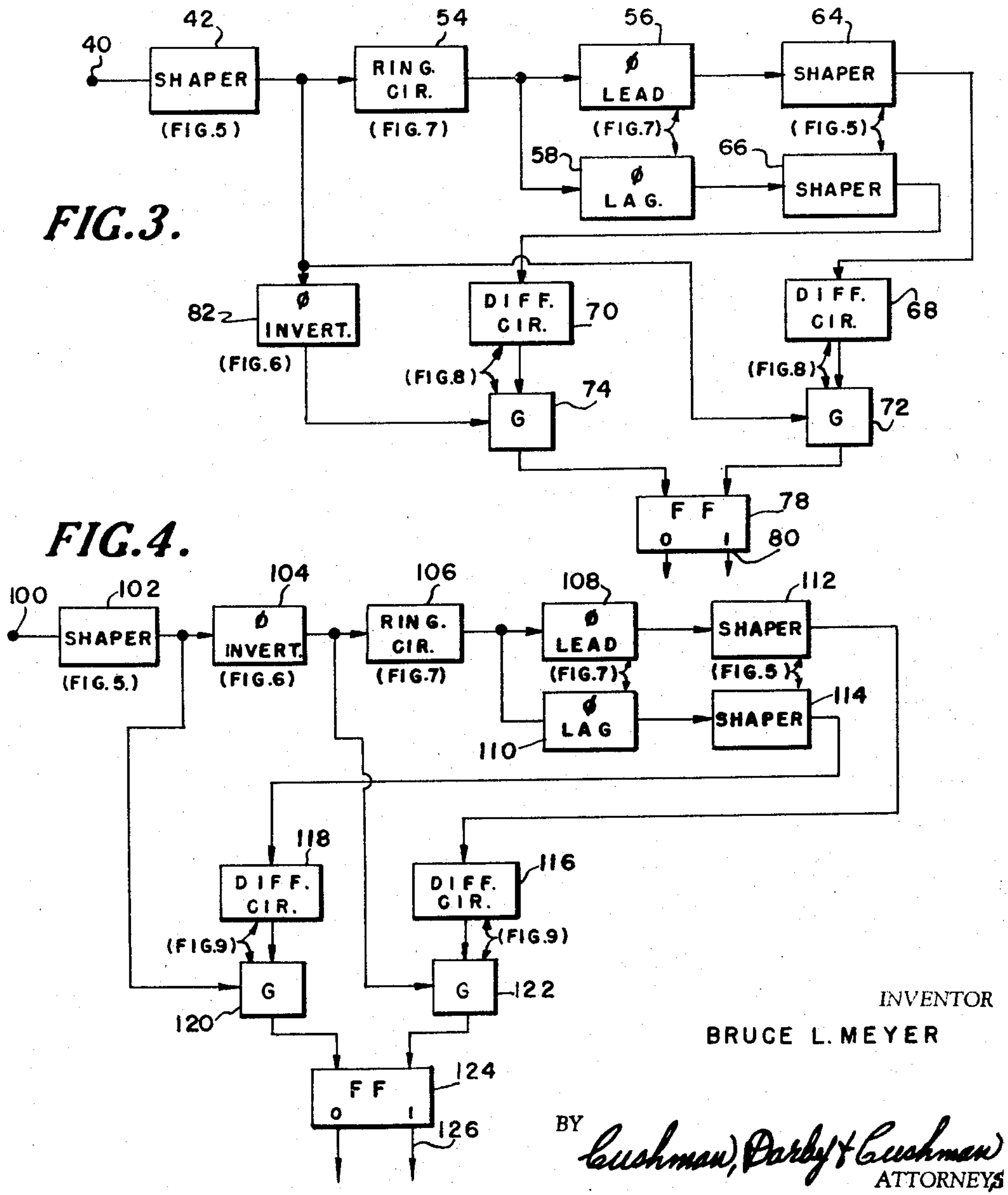
Figure 3 illustrates an exemplary specific embodiment of the invention wherein the abovementioned waveforms may be expected.
Figure 4 illustrates a modification of the invention.

Figure 3 is a functional block diagram illustrating an exemplary embodiment of this invention. The incoming phase modulated wave is applied to terminal 40. For illustrative purposes assume the idealized wave 36 illustrated in Figure 2*c* is applied thereto. This modulated sine wave is squared by shaper 42 to produce the wave of Figure 2*d*. When there is modulation switching and the phase transient 44 so produced is derived from the phase advanced wave 32, a narrow rectangular wave 46 is produced as illustrated at times 0 and $4\pi$ in Figure 2*d*; when because of modulation switching, a phase transient 48 is derived from the relatively phase retarded carrier wave 30, a wide rectangular wave 50 is produced such as shown at times $2\pi$ and $8\pi$. The condition of no modulation switching and therefore no phase transient is illustrated by intermediate width rectangular waves 52 approximately occurring at times $6\pi$, $10\pi$, and $12\pi$.

The squared input wave of Figure 2*d* is applied to the receiver reference tank circuit in an oscillator or ringing circuit 54 which changes the squared incoming signal of Figure 2*d* to the reference wave illustrated in Figure 2*e*. This reference wave is applied to a phase lead network 56 and to a phase lag network 58 producing, respectively, the solid wave 60 and the dotted line wave 62 shown in Figure 2*f*. The phase difference between these waves establishes the phase-times zone or range of allowable phase shift in which no detection will occur. If the two waves 60 and 62 are shifted equal amounts from the reference wave of Figure 2*e* so as to be symmetrically displaced therefrom, the phase shift of the incoming signal must be greater than one-half the phase differential between waves 60 and 62 to produce an information output.

The two phase shifted reference waves 60 and 62 are squared by shapers 64 and 66, respectively, as shown in Figures 2*g* and 2*h*. The squared waves are respectively differentiated by circuits 68 and 70, wherein also the resulting positive voltage impulses are clipped and discarded, and the resulting negative voltage impulses (Figures 2*i* and 2*j*, respectively) are used in negative coincidence gates 72 and 74. When a negative portion of the wave from shaper 42 (Figure 2*d*) coincides in gate 72 with a negative voltage impulse from the differentiated phase lead reference wave (Figure 2*i*), a phase advance transient, such as transient 44 (Figure 2*c*), is indicated by the gated output impuses 76 illustrated in Figure 2*m*. These output impulses force bistable circuit 78 (Figure 3), which may be an Eccles-Jordan type of flip-flop, to a state arbitrarily defined as a "1" so that its output on line 80 becomes positive as shown in Figure 2*p*. Similarly, a sufficiently severe phase retard transient, such as transient 48 (Figure 2*c*), causes the differentiated phase lag reference wave (Figure 2*j*) to coincide with a positive portion of the output (Figure 2*d*) of shaper 42. Since this embodiment uses negative coincidence gates, phase inverter 82 is employed to invert the wave of Figure 2*d* to the wave of Figure 2*k*. This latter wave is applied to gate 74 and when the negative portion thereof coincides with a negative voltage impulse of Figure 2*j*, gated output impulses 84 occur as shown in Figure 2*n*. This output triggers bistable circuit 78 to its opposite state which is arbitrarily defined as "0"; thereupon, the output on line 80 becomes negative as illustrated in Figure 2*p*. Thus, the modulating, information wave shown in Figure 2*b* is reproduced as shown in Figure 2*p*. The detection criteria above apply irrespective of what portion of the cycle of carrier wave 30 the phase transient occurs, provided that the axis-crossing of the reference wave (Figure 2*e*) is made anti-coincident with that of the information wave (Figure 2*b*). It is preferred to modulate at the axis-crossings of the carrier wave using a 90° phase shift.

The zone of no detection or range of undetectable phase shift is represented for each cycle in Figures 2*c* through 2*p* by the space between the dashed vertical lines 90. As the phase or time zone of no detection is increased, a larger phase transient is required to produce an output. Thus, susceptibility to noise is reduced while bandwidth is increased. The reverse is also true. The optimum zone of no detection is determined by a proper analysis of each digital communication problem.

Another embodiment of this invention is illustrated in Figure 4 wherein positive coincidence gates are used. Assume the phase modulated wave illustrated in Figure 2*c* is applied to terminal 100 and is squared by shaper 102, the output of which is identical to the wave illustrated in Figure 2*d*. This shaped wave is inverted by phase inverter 104 to the form shown in Figure 2*k* before being applied to the receiver reference ringing circuit 106. The output of circuit 106 is the inverted image of the wave illustrated in Figure 2*e*. This reference wave is applied to phase lead network 108 and to phase lag network 110 producing inverted images of the waves illustrated in Figure 2*f*. As previously described, the phase difference between these waves establishes the phase-time zone of no detection.

These phase-shifted reference waves are squared by shapers 112 and 114, respectively, producing the inverse of the waves shown in Figures 2*g* and 2*h*, respectively. These latter waves are differentiated and negatively clipped by circuits 116 and 118, respectively. When a positive portion of the wave (Figure 2*d*) produced by shaper 102 coincides with a positive voltage impulse of the differentiated phase lag reference wave in gate 120, a phase retard transient, such as transient 48 in Figure 2*c*, is indicated by "0" output impulse from gate 120. In this embodiment wherein an Eccles-Jordan type of flip-flop is triggered, the output is preferably a negative impulse. Similarly a phase advance transient like transient 44 of Figure 2*c* causes the positive portion of the inverted input (output wave of Figure 2*k* from phase inverter 104) to coincide with a positive voltage impulse of the differentiated phase lead reference wave in gate 122. The response of bistable circuit 124 to the impulses from gates 120 and 122 reproduces the same modulating wave on output line 126 as shown in Figure 2*p*.

In any demodulator embodiment involved in a system using abrupt modulation, i.e., an almost instantaneous change in phase angle, the phase transient can most easily be detected soon after the modulation occurs; that is, preferably, when the phase differential is large which is at or near the first following axis-crossing of the reference wave. Even though the demodulator described herein is intended primarily to detect phase changes occurring in less than one carrier cycle, such abrupt modulation is not essential to the operation of this invention. In this type of demodulator, gradual modulation, i.e., a change in phase angle occupying more than one carrier cycle, is detected as a series of electrical impulses derived as hereinbefore described. The reference circuits maintain a phase difference with respect to the modulated wave over the number of cycles used for modulation.

Figures 5, 6, 7:
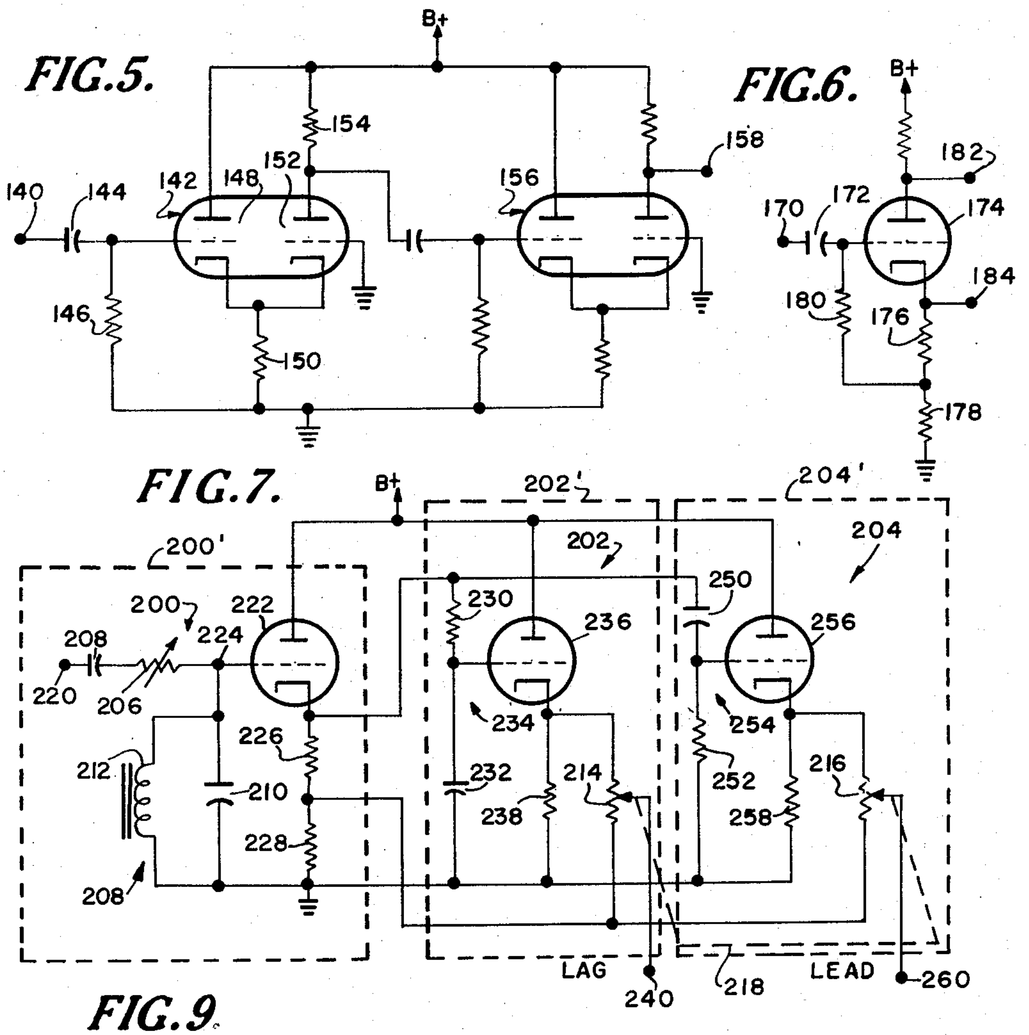
Figure 5 illustrates an exemplary shaper circuit.
Figure 6 illustrates an exemplary phase inverter.
Figure 7 illustrates an exemplary ringing circuit, and a phase-lag and a phase-lead network.

A shaper circuit usable in the above specific embodiments is illustrated in Figure 5. This circuit is commonly called a "cathode coupled clipper." Any input wave applied to terminal 140 is directly coupled to dual triode 142 by coupling capacitor 144 and resistor 146. As the input goes positive, triode section 148 conducts more heavily thereby increasing the voltage drop across resistor 150. This raises the voltage on the cathodes of both triode sections above ground, thereby tending to cut off triode section 152. The current through resistor 154 decreases thereby causing the plate voltage of triode section 152 to rise. Likewise, when the input to terminal 140 goes negative, triode section 148 tends to be non-conductive thereby reducing the voltage drop across resistor 150. The cathode voltage approaches ground making triode section 152 more conductive and thereby lowering the plate voltage. The input wave is sufficiently negative to drive triode section 148 to cut off thereby clipping the negative half-cycle, while during the positive half-cycle triode section 152 is driven to cut off by the rise in cathode voltage. Both half-cycles are clipped without drawing grid current. The circuit including dual triode 156, which operates in the same manner as the circuit including dual triode 142, insures the output wave at terminal 158 is adequately squared. It is preferable that dual triode 142 have high m$\mu$ characteristics such as tube number 12AX7, and that dual triode 156 have high frequency characteristics such as tube number 12AT7.

The phase inverter in the above specific embodiments may be of any type such as, for example, an RC-coupled amplifier, a transformer, or a phase-splitter. Figure 6 illustrates a phase splitter in which the input wave applied to terminal 170 is capacitively coupled by condenser 172 to the control grid of vacuum triode 174. Resistor 176 provides grid bias while resistor 178 establishes the D.-C. grid level. Resistors 176 and 180 provide a D.-C. path from grid to cathode. The inverted signal is produced at terminal 182, while an in-phase signal appears at terminal 184 across cathode resistors 176 and 178.

Figure 7 illustrates exemplary means for producing a reference wave and its lag and lead components. The reference ringing circuit 200 within dashed lined box 200' feeds phase leg network 202 in box 202' and phase lead network 204 in box 204' in parallel. The operation of these circuits is adjustable in that variable resistor 206 varies the coupling of condenser 208 and the effect of the signal source loading so that the effective "Q" of tank circuit 209 varies as does the effective "Q" of the whole grid input circuit, which besides resistor 206 and condenser 208 includes LC tank circuit 209 consisting of inductance 212 and capacitance 210. Adjustability is also present in that the phase differential between the lead and lag components may be varied by changing the tap positions on resistors 214 and 216 by a common control designated by chain line 218.

In the ringing circuit 200 of Figure 7, a squared input wave, such as that of Figure 2*d*, applied at terminal 220 is coupled by D.-C. blocking capacitor 208 and resistor 206 to vacuum triode 222 in parallel with tank circuit 209. This input wave provides energy to said tank circuit causing oscillations which tend to synchronize in phase to the incoming wave. Inductance 212 and capacitor 210 are tuned to the carrier frequency, and therefore produce oscillations identical in frequency to the incoming unmodulated carrier wave. The adjustment of variable resistor 206 determines the time required for said tank circuit to substantially resynchronize with the incoming wave after modulation occurs. As resistance 206 is increased, the effect of the signal source loading is decreased so that a longer time is required for the voltage at junction 224 to reach its cyclic "steady" value, while the effective "Q" of tank circuit 209 and of the whole grid input circuit is increased, thereby increasing the resynchronization time. Similarly, as resistance 206 is decreased, the effect of the signal source loading is increased and the effective "Q" of the tank circuit 209 and the grid circuit is decreased, thereby decreasing the resynchronization time. Preferably, this time is adjusted to a value equal to from three-fourths to a full carrier cycle period. This means that this demodulator can demodulate information in a system using one carrier cycle per bit of information.

Vacuum triode 222 with resistors 226 and 228 form a cathode follower amplifier. The cathode voltage of triode 222 follows the oscillations of tank circuit 209 and drives the phase lead and phase lag networks 202 and 204 in parallel.

Resistor 230 and capacitor 232 in the phase lag network 202 of Figure 7 form a passive phase delay network 234 to the grid of vacuum triode 236. The cathode follower circuit including vacuum triode 236 and cathode resistor 238 provides a low output impedance for the delayed wave. The output phase is tapped from a resistor 214 which is in series circuit with resistors 238 and 228. As the tap is moved toward the cathode of tube 236 the phase lag or retard angle of the wave at terminal 240 with respect to the reference wave (Figure 2*e*) across resistor 228 is increased.

Similarly, in the phase lead network 204 of Figure 7, capacitor 250 and resistor 252 form a passive phase advance network 254 to the grid of vacuum triode 256. The cathode follower circuit including vacuum triode 256 and cathode resistor 258 provide a low impedance output for the phase advanced wave. The phase advanced wave is tapped from resistor 216 which is in series circuit with resistors 258 and 228. As the output tap is moved toward the cathode of tube 256, the phase advance of the wave at terminal 260 with respect to the reference wave is increased. When the taps are adjusted to zero phase differential, i.e., when the taps on resistors 214 and 216 are furthest from their respective cathodes, the reference wave appears at both terminals 240 and 260.

It is preferred that the taps on resistors 214 and 216 be adjusted by a common control such as designated by dash line 218. This assures symmetry of the zone of no detection with respect to the reference wave; that is, the angle of phase advance is equal to the angle of phase retard. However, the taps on resistors 214 and 216 need not be ganged by control 218 and the range of no phase detection need not be symmetrical, i.e., the phase advance angle of wave 60 of Figure 2*f* need not be equal to the phase retard angle of wave 62, both waves being considered with respect to the phase of the reference wave of Figure 2*e*. In the exemplary embodiment, the RC networks 234 and 254 each cause equal phase change in opposite directions of about 45° at a frequency of 1600 cycles per second. With 90° abrupt modulation, about 10° is utilized to make the zone of no detection 20° wide. When taps on both resistors 214 and 216 are at resistor 228 potential, i.e., at their lower ends, the waves at terminals 240 and 260 are in phase. The demodulator will operate at this latter in-phase condition, but fortuitous minor phase changes will, under such condition, produce undesirable outputs from the demodulator.

Figure 8:
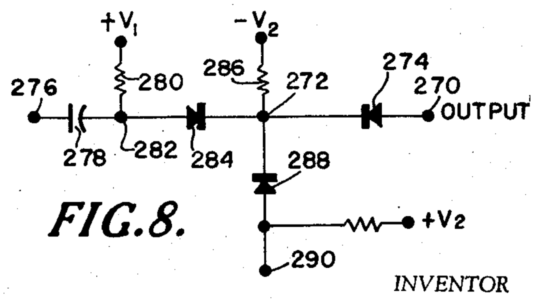
Figure 8 illustrates an exemplary diode coincidence gating circuit.

Figure 8 illustrates a diode negative coincidence gate usable with the embodiment of this invention illustrated in Figure 3 as either gate 72 or 74. Output terminal 270 connects to one of the inputs of flip-flop 78. When junction 272 is positive with respect to terminal 270, diode 274 is cut off and the flip-flop remains unaltered. Either a leading or lagging reference wave applied to input terminal 276 is differentiated by capacitor 278 and resistor 280. When said differentiated wave at junction 282 is negative, diode 284 is cut off. Resistances 280 and 286 are such that junction 272 is held positive with respect to output terminal 270 by current flowing through both diodes 284 and 288. The input wave to terminal 290 is a square wave as illustrated in Figure 2*d* or Figure 2*k*. When said square wave is negative and a negative differentiated impulse appears at junction 282, a negative voltage impulse appears at junction 272 and output terminal 270 which triggers said flip-flop.

Figure 9:
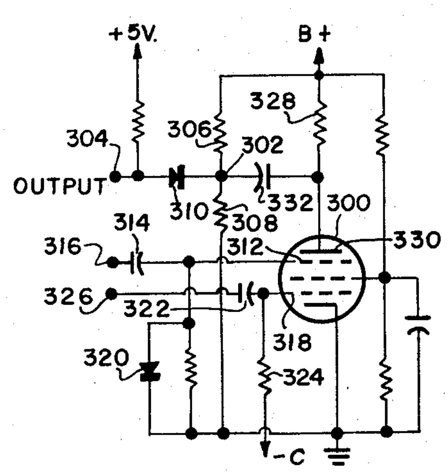
Figure 9 illustrates an alternate coincidence gating circuit.

Figure 9 illustrates an electronic coincidence gate usable with the embodiment of this invention illustrated in Figure 4 as gate 120 or 122. In the quiescent state vacuum pentode 300, which may be a 6AS6 for example, is nonconductive. Junction 302 is positive with respect to output terminal 304 as determined by the voltage divider consisting of resistors 306 and 308. When junction 302 becomes negative, diode 310 conducts causing a negative impulse at output terminal 304 which triggers flip-flop 124 in Figure 4.

A squared input wave, such as the one illustrated in Figure 2*d*, is applied to suppressor grid 312 through condenser 314 from input terminal 316. When said wave is negative the vacuum pentode is non-conductive; when positive, it is conditionally conductive depending on the potential of control grid 318. To limit the current in the suppressor grid 312 and to establish the cut off bias level, diode 320 clamps suppressor grid 312 to ground during the positive excursion of the input wave.

Usually the potential of control grid 318 is at a bias voltage of about −11 volts, making pentode 300 nonconductive regardless of the potential of suppressor grid 312. Capacitor 322 and resistor 324 differentiate the reference wave applied to terminal 326. When a positive differentiated wave appears at control grid 318 and suppressor grid 312 is at ground potential, vacuum pentode 300 conducts. Upon conduction current flows through plate resistor 328 causing a negative impulse to appear at plate 330 which is coupled by capacitor 332 to junction 302. This negative impulse is passed by diode 310 to rigger flip-flop 124 in Figure 4, In the appended claims the reference therein to an input signal having phase modulated and unmodulated carrier wave components refers to a signal like that of Figure 2*c* wherein a portion of the wave is unmodulated and another portion is phase modulated, the signal being the result of an unmodulated carrier wave subjected to phase angle modulation, abrupt or otherwise, at predetermined times.

Thus it is apparent that there is provided by this invention circuits and systems in which the various phases, objects, and advantages herein set forth are successfully achieved.

Modifications of this invention not described herein will become apparent to those of ordinary skill in the art. Therefore, it is intended that the matter contained in the foregoing description and the accompanying drawings be interpreted as illustrative and not limitative, the scope of the invention being defined in the appended claims.

What is claimed is:

1. A circuit for demodulating an angle modulated input signal at least partially modulated in accordance with a given phase modulating wave comprising means responsive to said input signal for generating first and second waves phase displaced from each other an amount equal to the sum of the angle of phase advance of said first wave with respect to a predetermined reference point and the angle of phase retard of said second wave with respect to said reference point, means responsive to one of said first and second waves and to the input signal for causing an output signal only if the input signal is then modulated an angle less than the phase displacement angle of said one wave, and means responsive to the other of said first and second waves and to the input signal for causing a second output signal only if the input signal is then modulated an angle greater than the phase displacement angle of said other wave from the reference point, the arrangement being such that said output signals are indicative of the modulating wave.

2. A circuit for demodulating an input signal which recurrently shifts its phase in accordance with phase modulation, including desired modulation, resulting in successive modulated and unmodulated carrier wave components in the input signal comprising means for generating a reference wave in response to said input signal, means for generating a phase leading wave and a phase lagging wave from said reference wave, said leading wave being advanced in phase from said reference wave a first predetermined angle and said lagging wave being retarded in phase from said reference wave a second predetermined angle, means responsive to said lagging wave and to the input signals for detecting in the input signal a change from a modulated component to an unmodulated component only if the phase shift then occurring in the input signal is greater than said second predetermined angle, and means responsive to said leading wave and the input signal for detecting in the input signal a change from an unmodulated component to a modulated component only if the phase shift then occurring is greater than said first predetermined angle, the arrangement being such that both detecting means provide indication of the input signal phase shifts resulting from said desired modulation without interference from possible extraneous input signal phase shifts which are themselves of the less than one of said predetermined angles.

3. A circuit as in claim 2 wherein said first predetermined angle of the leading wave is equal to said second predetermined angle of the lagging wave.

4. A circuit as in claim 2 wherein the means for generating said reference wave includes a tank circuit tuned to the frequency of the unmodulated carrier wave components of said input signal.

5. A circuit as in claim 2 wherein the means for generating said reference wave includes means for substantially squaring the input signal and a tank circuit responsive to the squared signal and tuned to oscillate at the frequency of the unmodulated components of said input signal.

6. A circuit as in claim 5 wherein the means for producing the phase leading wave and the means for producing the phase lagging wave each include a passive network responsive to current varying in accordance with the oscillations of said tank circuit.

7. A circuit as in claim 2 wherein the means for generating said reference wave includes a tank circuit tuned to the frequency of said unmodulated components and means including a resistor for coupling said input signal to the tank circuit, the size of said resistor being determinative of the time required for said tank circuit to become substantially resynchronized in phase with the input signal after the phase thereof advances or retards more than said advance angle or retard angle respectively.

8. A circuit as in claim 7 wherein said resistor has a value such that the resynchronization time is less than the time of one carrier cycle.

9. A circuit as in claim 7 wherein the means for producing the leading wave and the means for producing the lagging wave each includes a resistance capacitance network responsive to current varying in accordance with the oscillations of said tank circuit.

10. A circuit as in claim 9 including means for shaping said input signal to a predetermined form, said input means of the reference wave generating means being responsive to the shaped signal, means to invert the shaped signal, and wherein each of said detecting means includes gating means, one of said gating means being enabled by predetermined portions of the shaped signal and the other of said gating means being enabled by similar predetermined portions of the inverted shaped signal.

11. A circuit as in claim 10 wherein said phase leading and lagging wave generating means further includes means for shaping said phase leading and phase lagging waves respectively to a predetermined form, and means for differentiating the shaped leading and lagging waves, said gating means being respectively connected to the differentiating means for passing the differentiated shaped leading and lagging waves when enabled.

12. A circuit as in claim 9 wherein the means for shaping the leading wave and lagging wave includes two control means for varying said phase advance and phase retard angles respectively.

13. A circuit as in claim 12 wherein the phase angle control means are connected together in a manner such that the phase advance and phase retard angles are always substantially equal.

14. A circuit as in claim 2 wherein said detecting means each includes gating means, one of said gating means being enabled in response to predetermined portions of said input signal and the other of said gating means being enabled in response to other predetermined portions of said modulated wave.

15. A circuit as in claim 14 including means for shaping the input signal into predetermined form, and means for inverting said shaped signal, one of said gating means being enabled by predetermined portions of a shaped signal and the other of said gating means being enabled by similar predetermined portions of the inverted shaped signal.

16. A circuit as in claim 15 wherein the predetermined portions of said shaped signal and of said inverted shaped signal are the negative portions thereof.

17. A circuit as in claim 15 wherein the predetermined portions of said shaped signal and of said inverted shaped signal are the positive portions thereof.

18. A circuit as in claim 15 wherein said phase leading and lagging wave generating means further includes means for shaping said leading and lagging waves respectively to a predetermined shape and means for the respective differentiation of the shaped waves, said gating means being respectively coupled to the differentiating means for effectively passing the differentiated waves when enabled.

19. A circuit as in claim 18 and further including bistable means responsive to the output of said gating means respectively for reproducing only the desired modulation of said input signal.

20. A circuit for demodulating an input signal phase shifted by modulation including predetermined modulation comprising means responsive to said input signal for developing a second signal which is an inversion of said input signal, means responsive to only one of the said input and second signals for generating first and second waves displaced from each other a predetermined phase angle, and means for combining the signal to which the generation means is responsive with the leading one of said angle displaced waves and for separately combining the other of said signals with the lagging one of said waves to cause an indication of only said predetermined modulation.

References Cited in the file of this patent

UNITED STATES PATENTS

| | | |
|---|---|---|
| 2,399,091 | Bingley et al. | Apr. 23, 1946 |
| 2,530,081 | Ross | Nov. 14, 1950 |
| 2,585,532 | Briggs | Feb. 12, 1952 |
| 2,629,775 | Goldstine | Feb. 24, 1953 |
| 2,713,677 | Scott et al. | July 19, 1955 |